(12) United States Patent
Khan et al.

(10) Patent No.: US 7,221,739 B1
(45) Date of Patent: May 22, 2007

(54) CALLBACK FUNCTION FOR MESSAGING PLATFORM IN PUBLIC TELEPHONE SYSTEM

(75) Inventors: Azhar I. Khan, Norcross, GA (US); Navneet A. Patel, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 196 days.

(21) Appl. No.: 10/294,360

(22) Filed: Nov. 14, 2002

(51) Int. Cl.
*H04M 3/432* (2006.01)

(52) U.S. Cl. .................. 379/88.13; 379/69; 379/88.21; 379/88.25; 455/413

(58) Field of Classification Search ............... 379/67.1, 379/88.19, 88.21, 88.22, 76, 88.12, 88.23, 379/88.25, 88.18, 69, 88.13; 455/412, 413, 455/417, 414, 415, 412.2
See application file for complete search history.

(56) References Cited

U.S. PATENT DOCUMENTS

| | | | |
|---|---|---|---|
| 5,027,384 A | | 6/1991 | Morganstein |
| 5,471,519 A | | 11/1995 | Howe et al. |
| 5,479,496 A | | 12/1995 | Endo et al. |
| 5,481,597 A | * | 1/1996 | Given .................. 379/88.23 |
| 5,590,187 A | | 12/1996 | Greenspan |
| 5,652,789 A | * | 7/1997 | Miner et al. ........... 379/201.01 |
| 5,742,905 A | | 4/1998 | Pepe et al. |
| 5,857,013 A | | 1/1999 | Yue et al. ..................... 379/67 |
| 5,930,338 A | | 7/1999 | McKendry et al. |
| 6,021,190 A | | 2/2000 | Fuller et al. |
| 6,052,440 A | * | 4/2000 | Yuhn ....................... 379/88.13 |
| 6,389,008 B1 | * | 5/2002 | Lupien et al. .............. 370/352 |
| 6,389,279 B1 | * | 5/2002 | Calabrese et al. ........... 455/417 |
| 6,587,867 B1 | | 7/2003 | Miller et al. |
| 6,628,761 B1 | * | 9/2003 | Adamczyk et al. ....... 379/88.19 |
| 6,636,733 B1 | * | 10/2003 | Helferich ................. 455/412.2 |
| 6,683,942 B1 | * | 1/2004 | Sarp et al. ................ 379/88.23 |
| 6,751,299 B1 | * | 6/2004 | Brown et al. ............ 379/88.18 |
| 6,782,089 B1 | | 8/2004 | Blackburn et al. |
| 6,839,555 B2 | * | 1/2005 | Alger et al. ................ 455/413 |
| 6,853,718 B1 | | 2/2005 | Bedingfield, Sr. et al. |
| 6,891,931 B1 | * | 5/2005 | Adamczyk et al. ........... 379/69 |

OTHER PUBLICATIONS

U.S. Appl. No. 09/511,864, filed Feb. 25, 2000, Adamczyk.
"PacketIN™ Application Hosting Environment", Lucent Technologies, Copyright 2001.

* cited by examiner

*Primary Examiner*—Fan Tsang
*Assistant Examiner*—M. S. A. Elahee
(74) *Attorney, Agent, or Firm*—Lee & Hayes, PLLC

(57) ABSTRACT

A messaging system includes a messaging platform storing a message from a calling party, a switching mechanism for receiving a call from a subscriber to access the stored message, and a routing application at a server. The subscriber accesses the message at the messaging platform and signals for a callback connection with the calling party. In response, the messaging platform sends bookmark information to the routing application describing a current state of the messaging platform with regard to the subscriber. The routing application directs the switching mechanism to disconnect the subscriber from the messaging platform and connect the subscriber to the calling party. When the callback connection is completed, the routing application directs that the subscriber be re-connected with the messaging platform and sends the stored bookmark information back to same. The messaging platform employs such bookmark information to re-establish the current state.

17 Claims, 4 Drawing Sheets

CALLBACK FUNCTION FOR MESSAGING PLATFORM IN PUBLIC TELEPHONE SYSTEM

FIELD OF THE INVENTION

The present invention relates to a telephone system with a messaging platform that stores a message from a caller for a subscriber, and a callback function that sets up a call between the subscriber and the caller. More particularly, the present invention relates to such a system where the callback function is more efficiently implemented.

BACKGROUND OF THE INVENTION

In recent years, a number of new telephone service features have been provided by an Advanced Intelligent Network (AIN). The AIN evolved out of a need to increase the capabilities of the telephone network architecture in order to meet the growing needs of telephone customers or users. Additionally, as the number of people who rely on the Internet for communication increases, so too does the demand for the electronic transfer of data.

Referring now to FIG. 1, it is seen that an AIN-based network arrangement is provided within and/or in conjunction with a wire line telephone system LATA (Local Access and Transport Area) 101 that defines a calling service area. Note that a similar arrangement is also provided with and/or in conjunction with a wireless telephone system. Each LATA 101 (only one being shown in FIG. 1) includes stations (i.e. telephone lines and telephone equipment at the respective ends thereof) 103 and corresponding service switching points (SSPs) 105 (i.e., end offices or central offices). The SSPs 105 are each programmable switches which: recognize AIN-type calls; launch queries to service control points (SCPs) 107 (only one being shown in FIG. 1); and receive commands and data from SCPs 107 to further process and route AIN-type calls. A signal transfer point (STP) 109 may be employed to route signals between the SSPs 105, the SCPs 107, and other network elements. When one of the SSPs 105 is triggered by an AIN-type call, the triggered SSP 105 formulates an AIN service request and responds to call processing instructions from the network element in which the AIN service logic resides, typically at an SCP 107.

One type of event that may be arranged to set off an AIN trigger in an SSP 105 or the like is a call from a calling party to a called party where the called party subscribes to a messaging service and is unavailable to answer the call. Accordingly, the AIN trigger at issue is associated with the called party and with the SSP 105 of such called party. In response to the set-off trigger, the SSP 105 determines from the SCP 107 routing instructions for routing the call to the messaging platform. As may be appreciated, the messaging platform may play a greeting message to the calling party and then collect and store a voice message or the like therefrom. In addition, the messaging platform may collect and store call-related information including the time of the call and the telephone number of the calling party.

Thus, the called party/subscriber may at some later time call into the messaging platform and retrieve the stored voice message from the calling party, as well as the stored time of the call and the stored telephone number of the calling party. In addition, and in at least some instances, the calling party may signal to the messaging platform to call back the calling party at the stored telephone number.

In the prior art, the messaging platform resided on a telephone line of the public telephone system and thus was called into by the message-retrieving called party over the telephone line thereof. As a result, the messaging platform called back the calling party at the stored telephone number by way of another telephone line, and then bridged the call between the messaging platform and the called party and the call between the messaging platform and the calling party to form the callback connection between the called party and the calling party. Such an arrangement leaves the messaging platform involved in the call, and accordingly the messaging platform may continue to be accessed by the called party/subscriber after the called party and the calling party are finished with the connection therebetween. Accordingly, the called party/subscriber may listen to another voice message stored at the messaging platform, for example.

However, and significantly, such an arrangement is inefficient in that the messaging platform is using two telephone lines and bridging resources to form the callback connection, and in that the messaging platform is dedicating resources including call connection information and circuits that are essentially sitting idly until the callback connection is terminated by the called party, the calling party, or the like. In particular, the called party is callback connected to the calling party by way of the two telephone lines of the messaging platform and the bridging resources even when the messaging platform is not actively involved, and the messaging platform must watch over the callback connection the entire time. Potentially, the two telephone lines of the messaging platform, the bridging resources, and the messaging platform could be tied up for hours on end without any significant involvement on the part of the messaging platform with the callback connection between the called party and the calling party.

Accordingly, a need exists for a callback function for a messaging platform in a public telephone system, where the callback function more efficiently establishes a callback connection between a called party and a calling party. More particularly, a need exists for such a callback function that establishes a direct callback connection so that messaging platform resources employed during the callback are minimal, and yet that leaves the messaging platform available later should the called party/subscriber for example wish to listen to another voice message stored at the messaging platform.

SUMMARY OF THE INVENTION

The present invention satisfies the aforementioned need by providing a system and method in connection with a messaging system implemented as a service to a subscriber by a telephone service provider of the subscriber. The messaging system stores a message from a calling party calling the subscriber and a telephone number of the calling party, and allows the subscriber to access the stored message and call back the calling party based on the corresponding telephone number. The messaging system includes a switching mechanism for receiving a call from the subscriber to access the stored message, a messaging platform for storing the message from the calling party and the corresponding telephone number, and an application server running a routing application for routing communications between the subscriber, the messaging platform, and the calling party. The switching mechanism, the messaging platform, and the application server are all connected to a network.

In the method, the switching mechanism receives the call from the subscriber to the messaging platform and notifies the routing application that the subscriber is calling in to the messaging platform. The notified routing application directs the switching mechanism to establish communication between the subscriber and the messaging platform by way of the network, and the switching mechanism establishes such communication. The subscriber accesses the message from the calling party as stored at the messaging platform and during such accessing signals that a callback connection with the calling party is desired.

The messaging platform in response to the signal sends a message to the routing application by way of the network, where the message includes bookmark information relating to a current state of the messaging platform with regard to the subscriber. The routing application receives and stores the bookmark information and directs the switching mechanism to disconnect the subscriber from the messaging platform and connect the subscriber to the calling party.

Thereafter, the switching mechanism determines that the calling party has terminated the callback connection or that the subscriber has signaled to end the callback connection and thereafter notifies the routing application of same. The notified routing application directs that the subscriber be re-connected with the messaging platform and sends the stored bookmark information back to the messaging platform and the messaging platform employs such bookmark information to re-establish the current state.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
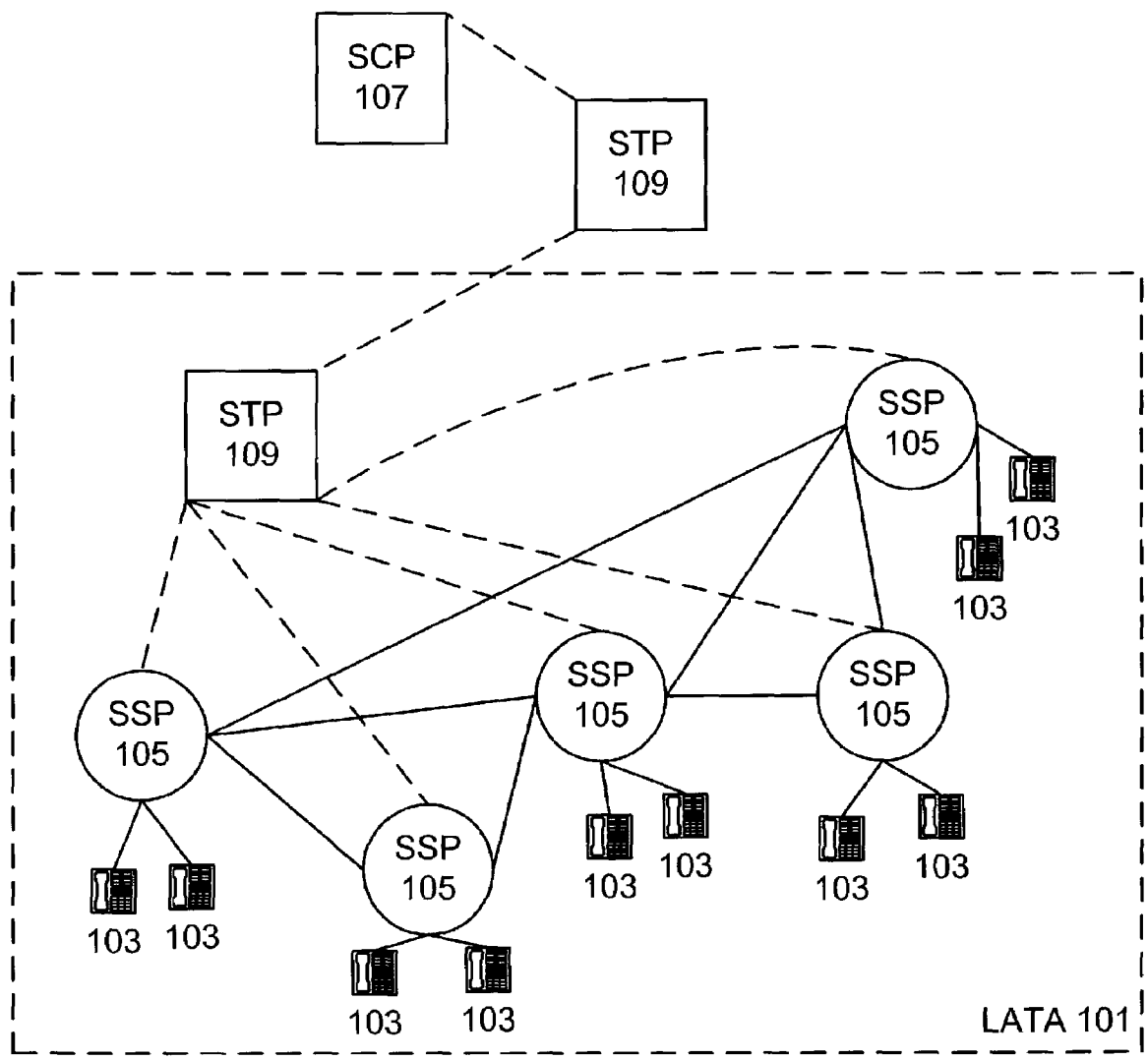
FIG. 1 is a block diagram showing a typical AIN-based telephone network such as may be employed in connection with the present invention.
Figure 2:
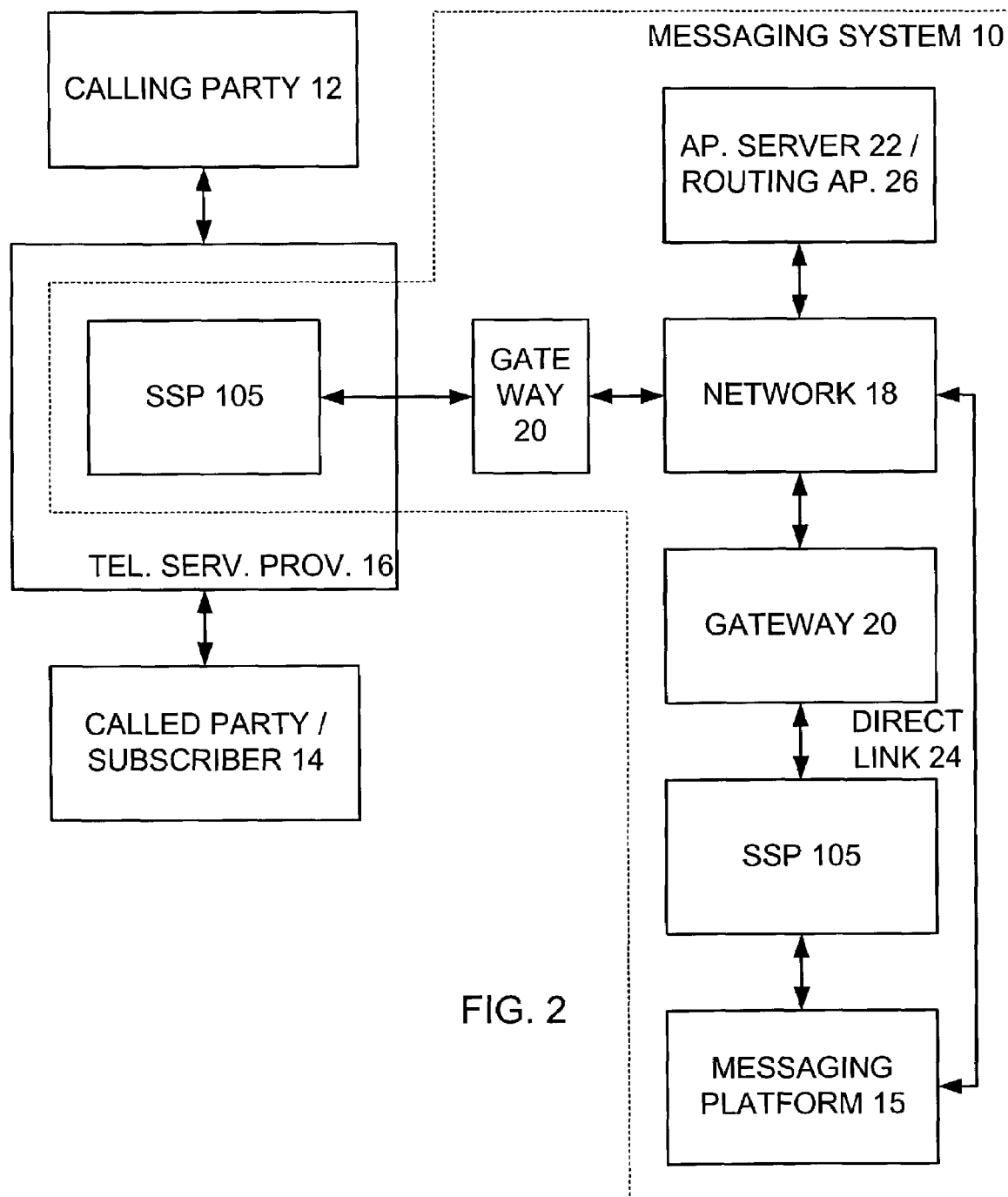
FIG. 2 is a block diagram showing a messaging system that allows a called party to call back a calling party that left a message in accordance with one embodiment of the present invention.

Referring to the drawings in detail, wherein like numerals are used to indicate like elements throughout, there is shown in FIG. 2 a messaging system 10 for providing a message service with a callback function in accordance with one embodiment of the present invention. When actuated, a call from a calling party 12 to a called party 14 is forwarded to a messaging platform 15. The messaging platform presents the calling party 12 with an opportunity to leave a voice message or the like for the called party 14, and records and stores such voice message and perhaps also the telephone number of the calling party 12, the call time, etc. The called party 14 may then call into the messaging platform 15 and retrieve the voice message. Typically, the called party 12 determines when the system 10 is actuated therefor.

Also typically, the messaging system 10 is implemented as a service to the called party 14 by the telephone service provider 16 of the called party 14, and is at least partially implemented at an SSP 105 or central office administered by the telephone service provider 16 and an SCP 107. The messaging system 10 may be AIN-based or non-AIN based without departing from the spirit and scope of the present invention. As was set forth above, the messaging system 10 when actuated forwards a call from the calling party 12 to the called party 14 to the messaging platform 15 based on a corresponding AIN trigger or the like being set off, followed by a service request from an SSP 105 to an SCP 107 which results in call processing instructions from the SCP 107 to the SSP 105 including how to connect the calling party 12 to the messaging platform 15.

Thus, the called party/subscriber 14 may at some later time call into the messaging platform 15 and retrieve the stored voice message from the calling party 14, as well as the stored time of the call and the stored telephone number of the calling party 14. In addition, and in at least some instances, the called party 14 may signal to the messaging platform 15 to call back the calling party 12 at the stored telephone number.

In one embodiment of the present invention, and as seen in FIG. 2, the messaging platform 15 is at a telephone line connected to an SSP 105, but when the called party/subscriber 14 calls into the messaging platform 15, the connection is made through a network 18 such as the Internet or the like. In particular, the SSP 105 of each of the called party/subscriber 14 and the messaging platform 15 includes a direct connection to a gateway 20 on the network 18. Note that the called party/subscriber 14 and the messaging platform 15 may share a common SSP 105, in which case the connection is still made through the network 18 by way of one or more gateways 20, for reasons that should be more clear from the below. If the network 18 is packet-based, as is the case with the Internet, the connection is also packet-based at least within the network 18.

In one embodiment of the invention, an application server 22 is also coupled to the network 18, and the messaging platform 15 is also coupled to the network through a direct link 24. Accordingly, the application server 22 can communicate directly with the messaging platform 15 over the network 18, again for reasons that should be more clear from the below.

In one embodiment of the present invention, the application server 22 runs a routing application 26 that efficiently routes communications between the called party/subscriber 14 and the messaging platform 15 and also that efficiently routes callback communications between the called party 14 and the calling party 12. Thus, the routing application 26 on the application server 22 in effect controls all communications during message retrieval and during any callbacks by the calling party/subscriber 14. The routing application 26 may also include a billing function that appropriately bills the calling party/subscriber 14 in connection with use of the messaging platform 15 and the callback communication.

In one embodiment of the present invention, the routing application 26, the SSP 105, and the messaging platform 15 all employ an enhanced hosting environment to enable packet-based communication by way of the network 18. For example, the environment may be the PACKETIN application hosting environment, available from LUCENT Technologies, Inc. of Murray Hill, N.J. As may be appreciated, such environment is a next-generation, converged-services platform that enables delivery of a wide variety of enhanced wire line and wireless services for converged voice and data networks, and that provides the infrastructure for new Internet Protocol (IP) and multimedia services.

The message platform 15, the gateways 20, the application server 22, the direct link 24, and the routing application 26 may respectively be any appropriate devices without departing from the spirit and scope of the present invention as long as such devices are capable of performing the functions and methods described herein. The operations of such devices are known or should be apparent to the relevant public and therefore need not be described herein in any detail except as set forth herein.

Figure 3A:
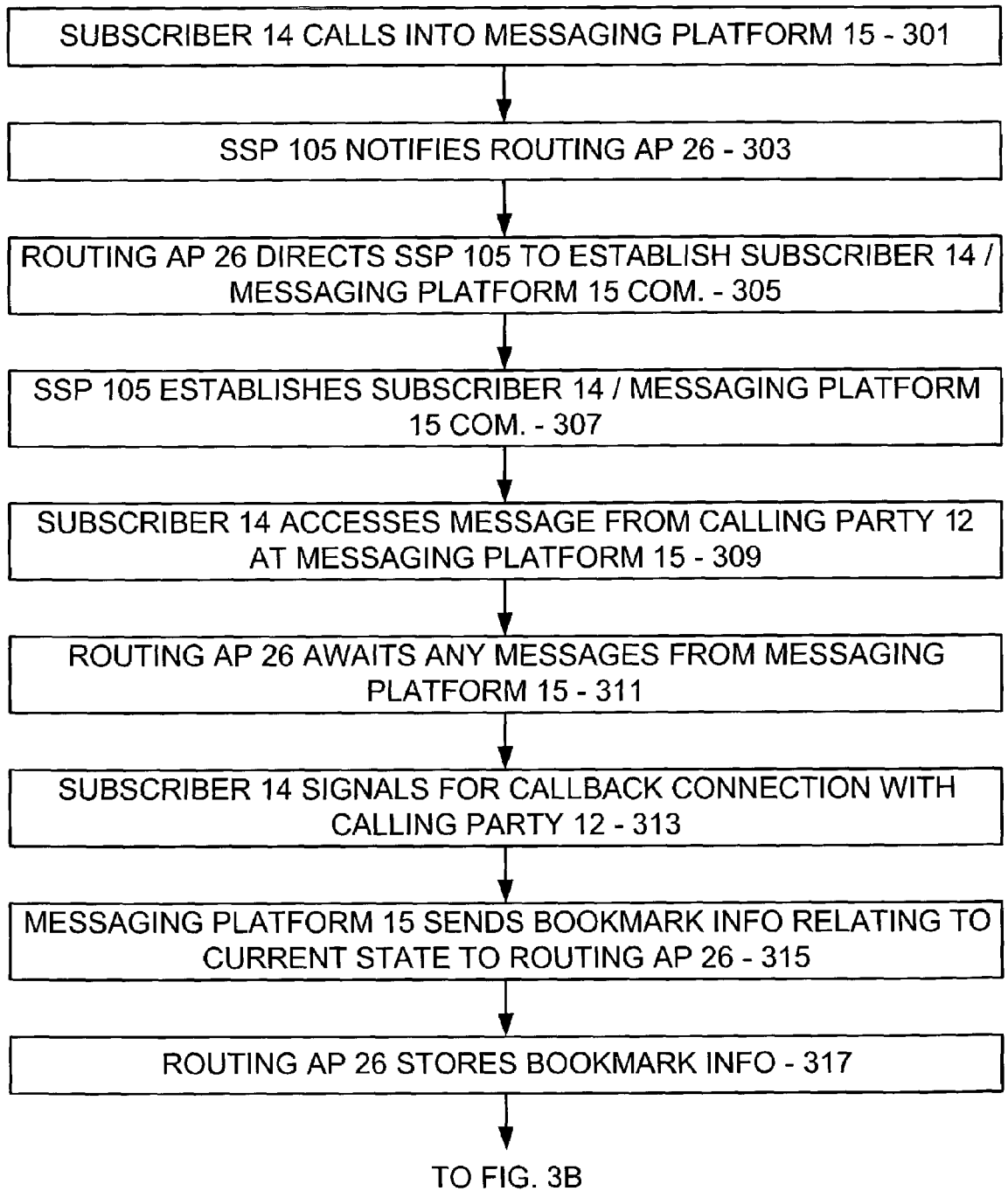
FIGS. 3A and 3B are flow diagrams showing steps performed in connection with the call back from the called party to the calling party of FIG. 2.
Figure 3B:
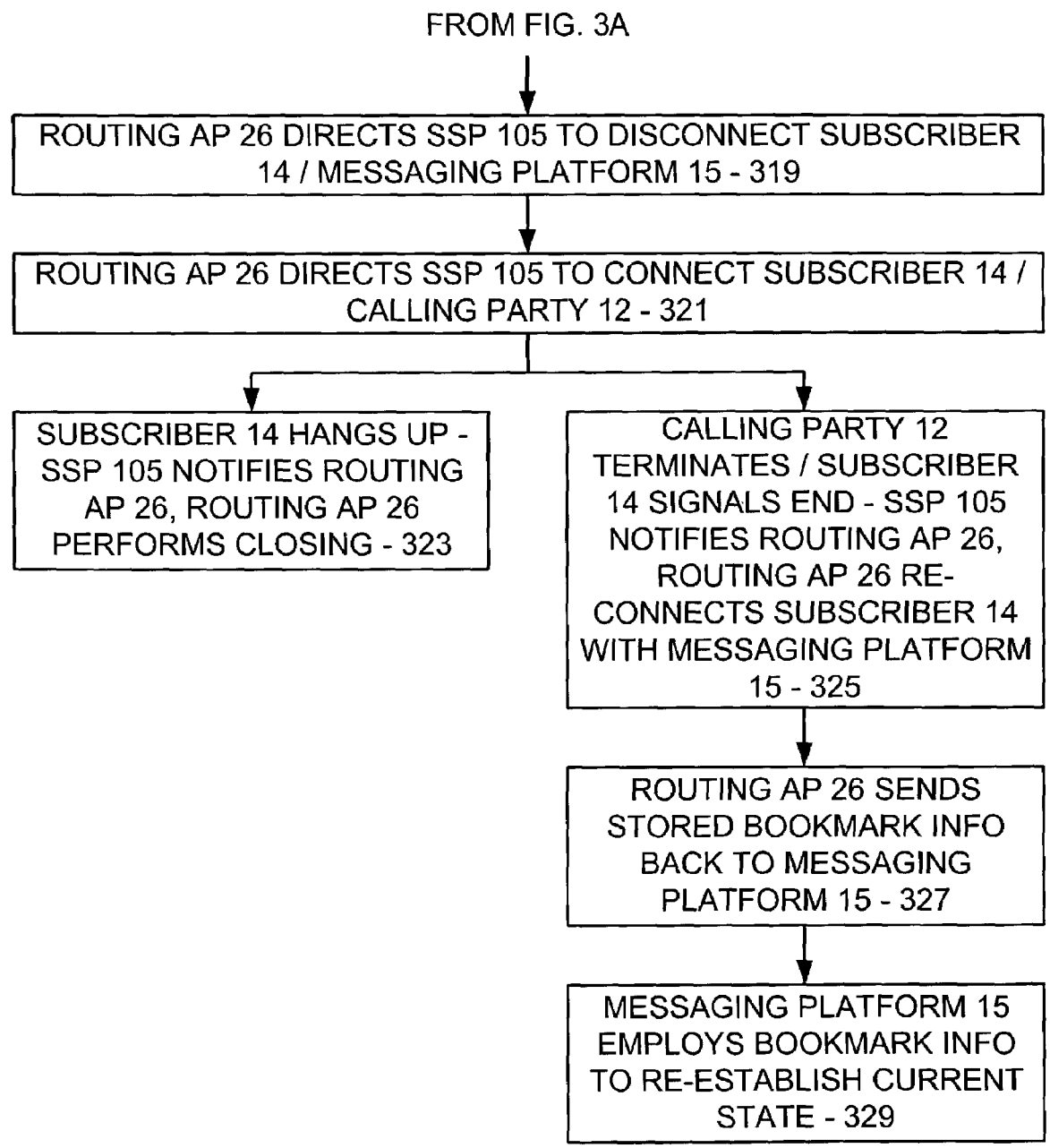

In one embodiment of the present invention, and turning now to FIGS. 3A and 3B, the messaging system 10 described herein operates in the following manner to efficiently establish a callback connection to allow a called party 14 to return a call from or call back a calling party 12 that previously left a message for the called party 14 with the messaging platform 15.

Bearing in mind that the messaging platform 15 has stored a message from a calling party 12 for the called party/subscriber 14, and that the messaging platform 15 has also stored the telephone number of the calling party 12, the process begins by the calling party/subscriber 14 (hereinafter 'subscriber 14') calling into the messaging platform 15 (step 301). In response thereto, the SSP 105 of the subscriber 14 notifies the routing application 26 by way of the gateway 20 and the network 18 that the subscriber 14 is calling in to the messaging platform 15 (step 303), and the routing application 26 directs the setup of the call by appropriately instructing the SSP 105 how to establish communication between the subscriber 14 and the messaging platform 15 by way of the gateways 20 and the network 18 (step 305). Accordingly, the SSP 105 in fact establishes such communication according to the instructions from the routing application (step 307), and the subscriber 14 accesses the message from the calling party 12 as stored at the messaging platform 15 (step 309). In the meantime, the routing application 26 awaits any messages that may be generated therefor by the messaging platform 15 and sent thereto by way of the direct link 24 and the network 18 (step 311).

At some point during accessing of the message from the calling party 12 as stored at the messaging platform 15, the subscriber 14 may decide to call back the calling party 12, and therefore signals the messaging platform 15 that a callback connection with the calling party 12 is desired (step 313). Such signaling may be accomplished in any appropriate manner without departing from the spirit and scope of the present invention, and may for example include entering a key sequence or verbally stating a command. In response to the signal, and in one embodiment of the present invention, the messaging platform 15 sends a message to the routing application 26 by way of the direct link 24 and the network 18, where the message includes 'bookmark' information relating to the current state of the messaging platform 15 with regard to the subscriber 14 (step 315). Such bookmark information may include an identifier of the subscriber 14 and/or a mailbox thereof at the messaging platform 15, an identifier of the accessed message that is the basis of the desired callback connection, the telephone number of the calling party 12 as correspondingly stored with the message, and the like.

The routing application 26 receives and stores the bookmark information and based thereon determines that a callback connection between the subscriber 14 and the calling party 12 is desired (step 317). Accordingly, the routing application 26 directs the SSP 105 to disconnect the subscriber 14 from the messaging platform 15 (step 319), thus freeing the messaging platform, and to connect the subscriber 14 to the calling party 12 at the telephone number thereof (step 321). Significantly, and in contrast with the prior art, only a single connection is required between the subscriber 14 and the calling party 12 in the present invention, and no bridging is necessary. In addition, the messaging platform 15 is entirely removed from the connection. Accordingly, the present invention establishes the connection more efficiently as compared with the prior art.

Notably, the SSP 105 remembers that the subscriber 14 is involved in a callback connection and that the subscriber 14 is to be re-connected to the messaging platform 15 when the callback connection is terminated unless the subscriber 14 hangs up and places the telephone line thereof on hook. If in fact the subscriber 14 hangs up, the SSP 105 notifies the routing application 26 of same and the routing application 26 performs any closing functions necessary (step 323), perhaps including notifying the messaging platform 15 and performing any billing functions.

Otherwise, if the calling party 12 terminates the callback connection or if the subscriber 14 signals to end the callback connection, perhaps by entering a key sequence or verbally stating a command as above, the SSP 105 notifies the routing application 26 of same and the routing application 26 re-connects the subscriber 14 with the messaging platform 15 (step 325). In addition, the routing application 26 sends the previously stored bookmark information back to the messaging platform 15 (step 327) and the messaging platform 15 employs such bookmark information to re-establish the current state at the point where the subscriber 14 requested the callback connection (step 329). In addition, the routing application 26 may perform any intermediate functions necessary, perhaps including performing any billing functions.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful system 10 that has a callback function for a messaging platform 15 in a public telephone system, where the callback function more efficiently establishes a callback connection between a called party 14 and a calling party 12. The callback function establishes a direct callback connection so that messaging platform resources employed during the callback are minimal, and leaves the messaging platform 15 available should the called party/subscriber 14 for example wish to listen to another voice message stored at the messaging platform 15. It should be appreciated that changes could be made to the embodiments described above without departing from the inventive concepts thereof. Notably, the present invention is equally applicable to wire line and wireless telephone systems, and to routing within or between such wire line and wireless systems. It should be understood, therefore, that this invention is not limited to the particular embodiments disclosed, but it is intended to cover modifications within the spirit and scope of the present invention as defined by the appended claims.

The invention claimed is:

1. A messaging system implemented as a service to a subscriber by a telephone service provider of the subscriber, the messaging system for storing a message from a calling party calling the subscriber and a telephone number of the calling party, the messaging system also for allowing the subscriber to access the stored message and call back the calling party based on the corresponding telephone number, the messaging system including:

a switching mechanism for receiving a call from the subscriber to access the stored message, the switching mechanism being connected to a network;

an application server connected to the network and running a routing application, the switching mechanism for notifying the routing application that the subscriber is calling in for the message;

a messaging platform for storing the message from the calling party and the corresponding telephone number, the messaging platform being connected to the network, wherein the notified routing application is configured for directing the switching mechanism to establish communication between the subscriber and the messaging platform by way of the network, the switching mechanism being for establishing such communication, whereby the subscriber accesses the message from the calling party as stored at the messaging platform and, during such accessing, signals that a callback connection with the calling party is desired, wherein the messaging platform is configured for sending a message to the routing application by way of the network in response to the signal, the message including bookmark information comprising an identifier of the stored message being accessed, wherein the routing application is configured for receiving and storing the bookmark information and directing the switching mechanism to disconnect the subscriber from the messaging platform and connect the subscriber to the calling party, wherein the switching mechanism is configured for determining that the calling party has terminated the callback connection or that the subscriber has signaled to end the callback connection and thereafter notifying the routing application of the termination or the signaled end to the callback connection, wherein the notified routing application is configured for directing that the subscriber be re-connected with the messaging platform and sending the stored bookmark information back to the messaging platform and the messaging platform employing such bookmark information to re-establish a current state wherein the routing application, the switching mechanism, and the messaging platform all employ a converged-services platform that enables delivery of wireline and wireless services for converged voice and data networks and is configured to provide internet protocol (IP) and multimedia services by way of the network of the messaging platform.

2. The system of claim 1 at least partially implemented at a service switching point (SSP) or central office administered by the telephone service provider.

3. The system of claim 1 wherein the messaging platform is connected to the network by way of a switching mechanism, whereby the call from the subscriber to access the stored message is connected to the messaging platform through the switching mechanism of the subscriber, the network, and the switching mechanism of the messaging platform.

4. The system of claim 3 wherein the switching mechanism of the subscriber is the switching mechanism of the messaging platform.

5. The system of claim 3 further comprising a direct link between the messaging platform and the network, whereby the routing application can communicate with the messaging platform by way of the direct link.

6. The system of claim 1 wherein the routing application, the switching mechanism, and the messaging platform all employ an enhanced hosting environment to enable packet-based communication by way of the network.

7. A method in connection with a messaging system implemented as a service to a subscriber by a telephone service provider of the subscriber, the messaging system being for storing a message from a calling party calling the subscriber and a telephone number of the calling party, the messaging system also being for allowing the subscriber to access the stored message and to call back the calling party based on the corresponding telephone number, the messaging system including a switching mechanism for receiving a call from the subscriber to access the stored message, a messaging platform for storing the message from the calling party and the corresponding telephone number, and an application server running a routing application for routing communications between the subscriber, the messaging platform, and the calling party, the switching mechanism, the messaging platform, and the application server all being connected to a network, the method comprising:

the switching mechanism receiving the call from the subscriber to the messaging platform;

the switching mechanism notifying the routing application that the subscriber is calling in to the messaging platform;

the notified routing application directing the switching mechanism to establish communication between the subscriber and the messaging platform by way of the network;

the switching mechanism establishing such communication, whereby the subscriber accesses the message from the calling party as stored at the messaging platform and, during such accessing signals that a callback connection with the calling party is desired;

the messaging platform in response to the signal, sending a message to the routing application by way of the network, the message including bookmark information comprising an identifier of the stored message being accessed;

the routing application receiving and storing the bookmark information and directing the switching mechanism to disconnect the subscriber from the messaging platform and connect the subscriber to the calling party;

the switching mechanism determining that the calling party has terminated the callback connection or that the subscriber has signaled to end the callback connection and thereafter notifying the routing application of the termination or the signaled end to the callback connection;

the notified routing application directing that the subscriber be re-connected with the messaging platform and sending the stored bookmark information back to the messaging platform and the messaging platform employing such bookmark information to re-establish a current state wherein the routing application, the switching mechanism, and the messaging platform all employ a converged-services platform that enables delivery of wireline and wireless services for converged voice and data networks and is configured to provide internet protocol (IP) and multimedia services by way of the network of the messaging platform.

8. The method of claim 7 wherein the bookmark information includes an identifier of the subscriber at the messaging platform, an identifier of the message, and the telephone number of the calling party.

9. The method of claim 7 wherein the messaging platform is connected to the network by way of a switching mechanism and by way of a direct link, the method comprising the routing application communicating with the messaging platform by way of the direct link.

10. The method of claim 7 comprising the routing application, the switching mechanism, and the messaging platform all employing an enhanced hosting environment to enable packet-based communication by way of the network.

11. A method comprising:
receiving a call from a subscriber to a messaging platform;
establishing communication between the subscriber and the messaging platform, such that the subscriber can access a message from a calling party that is stored at the messaging platform and can signal that a callback connection with the calling party is desired;
when the subscriber signals that a callback connection with the calling party is desired, storing bookmark information comprising an identifier of the stored message being accessed, disconnecting the subscriber from the messaging platform and connecting the subscriber to the calling party; and
when the calling party terminates the callback connection or the subscriber signals to end the callback connection, reconnecting the subscriber with the messaging platform and sending the stored bookmark information back to the messaging platform to re-establish a current state of the messaging platform
wherein the messaging platform and the subscriber are each connected to a network by a switching mechanism, whereby the call from the subscriber to access the stored message is connected to the messaging platform through the switching mechanism of the subscriber, the network, and the switching mechanism of the messaging platform,
wherein the switching mechanism of the subscriber is the switching mechanism of the messaging platform,
wherein communications are routed between the subscriber, the messaging platform, and the calling party by a routing application, and
wherein the routing application, the switching mechanism, and the messaging platform all employ a converged-services platform that enables delivery of wireline and wireless services for converged voice and data networks and is configured to provide internet protocol (IP) and multimedia services by way of the network.

12. The method of claim 11, at least partially implemented by a service switching point (SSP) or central office administered by a telephone service provider.

13. The system of claim 11, wherein the messaging platform and the subscriber are each connected to a network by a switching mechanism, whereby the call from the subscriber to access the stored message is connected to the messaging platform through the switching mechanism of the subscriber, the network, and the switching mechanism of the messaging platform.

14. The system of claim 13, wherein the switching mechanism of the subscriber is the switching mechanism of the messaging platform.

15. The system of claim 13, wherein communications are routed between the subscriber, the messaging platform, and the calling party by a routing application.

16. The system of claim 14, further comprising a direct link between the messaging platform and the network, whereby the routing application can communicate with the messaging platform by way of the direct link.

17. The system of claim 14, wherein the routing application, the switching mechanism, and the messaging platform all employ an enhanced hosting environment to enable packet-based communication by way of the network.

* * * * *